US010630762B1

(12) United States Patent
Matthews

(10) Patent No.: US 10,630,762 B1
(45) Date of Patent: Apr. 21, 2020

(54) MULTICAST NETWORK EMULATION

(71) Applicant: Amazon Technologies, Inc., Seattle, WA (US)

(72) Inventor: Nicholas Channing Matthews, Atlanta, GA (US)

(73) Assignee: Amazon Technologies, Inc., Seattle, WA (US)

( * ) Notice: Subject to any disclaimer, the term of this patent is extended or adjusted under 35 U.S.C. 154(b) by 828 days.

(21) Appl. No.: 15/082,733

(22) Filed: Mar. 28, 2016

(51) Int. Cl.
*H04L 29/08* (2006.01)
*H04L 29/06* (2006.01)
*H04L 12/749* (2013.01)

(52) U.S. Cl.
CPC ............ *H04L 67/08* (2013.01); *H04L 45/741* (2013.01); *H04L 65/4076* (2013.01); *H04L 67/1044* (2013.01)

(58) Field of Classification Search
USPC ......................................................... 709/231
See application file for complete search history.

(56) References Cited

U.S. PATENT DOCUMENTS

| 8,099,550 B1* | 1/2012 | Madnani | H04L 12/185 |
| | | | 370/312 |
| 2007/0086465 A1* | 4/2007 | Paila | H04H 60/72 |
| | | | 370/394 |
| 2007/0104192 A1* | 5/2007 | Yoon | H04L 12/4641 |
| | | | 370/389 |
| 2008/0240130 A1* | 10/2008 | Oved | G06F 9/541 |
| | | | 370/401 |
| 2011/0282949 A1* | 11/2011 | Rivkin | G06F 9/541 |
| | | | 709/206 |
| 2013/0283176 A1* | 10/2013 | Hoole | H04L 63/102 |
| | | | 715/736 |

(Continued)

FOREIGN PATENT DOCUMENTS

WO    WO-2010144000 A1 * 12/2010 ........... H04L 12/185

OTHER PUBLICATIONS

KR20020050570 (Year: 2002).*

*Primary Examiner* — Philip J Chea
*Assistant Examiner* — Ishrat Rashid
(74) *Attorney, Agent, or Firm* — Thorpe North & Western, LLP.

(57) ABSTRACT

A technology is described for emulating a multicast network. An example method may include receiving a data transaction request at a data store service. The data transaction request may contain a network packet for multicast distribution to destination clients, and the data transaction request may be received from a source client having a multicast conversion driver configured to convert the network packet into a data transaction request format. A determination may be made that the data transaction request is a multicast request to distribute the network packet to the destination clients. Having determined that the data transaction request is a multicast request, destination clients that are subscribed to receive the multicast group communication may be determined. A data record containing the network packet may be distributed to the destination clients, where the destination clients have the multicast conversion driver configured to convert the data record to the network packet.

21 Claims, 8 Drawing Sheets

(56) References Cited

U.S. PATENT DOCUMENTS

| | | | | |
|---|---|---|---|---|
| 2013/0347017 A1* | 12/2013 | Li | .................... | H04N 21/42203 |
| | | | | 725/18 |
| 2014/0351393 A1* | 11/2014 | Jin | ...................... | H04L 41/0813 |
| | | | | 709/221 |
| 2016/0226671 A1* | 8/2016 | Lemoine | ............... | H04L 61/103 |

* cited by examiner

MULTICAST NETWORK EMULATION

BACKGROUND

Multicast IP Routing protocols are used to distribute data to multiple recipients and are one of the packet types in Internet Protocol version 4 (IPv4) and Internet Protocol version 6 (IPv6) that include reserved multicast address blocks in IPv4 and IPv6. Using multicast, a source client can send a single copy of data to a single multicast address, which is then distributed to an entire group of destination clients. A multicast group identifies a set of destination clients that are subscribed to receive a particular data stream, and are represented by an IP address from a well-defined range. Data sent to the IP address is forwarded to all members of the multicast group using hardware duplication of packets at network appliances along the packets' routes through a network.

A source client sends data to a multicast group by setting the destination IP address of an IP packet to a multicast group address. Any client can be a source client and send data to a multicast group. Source clients do not need to register before sending data to a group, and do not need to be members of the group themselves. Routers between the source client and the destination clients duplicate the data packets and forward multiple copies to the destination clients.

DETAILED DESCRIPTION

Figure 1:
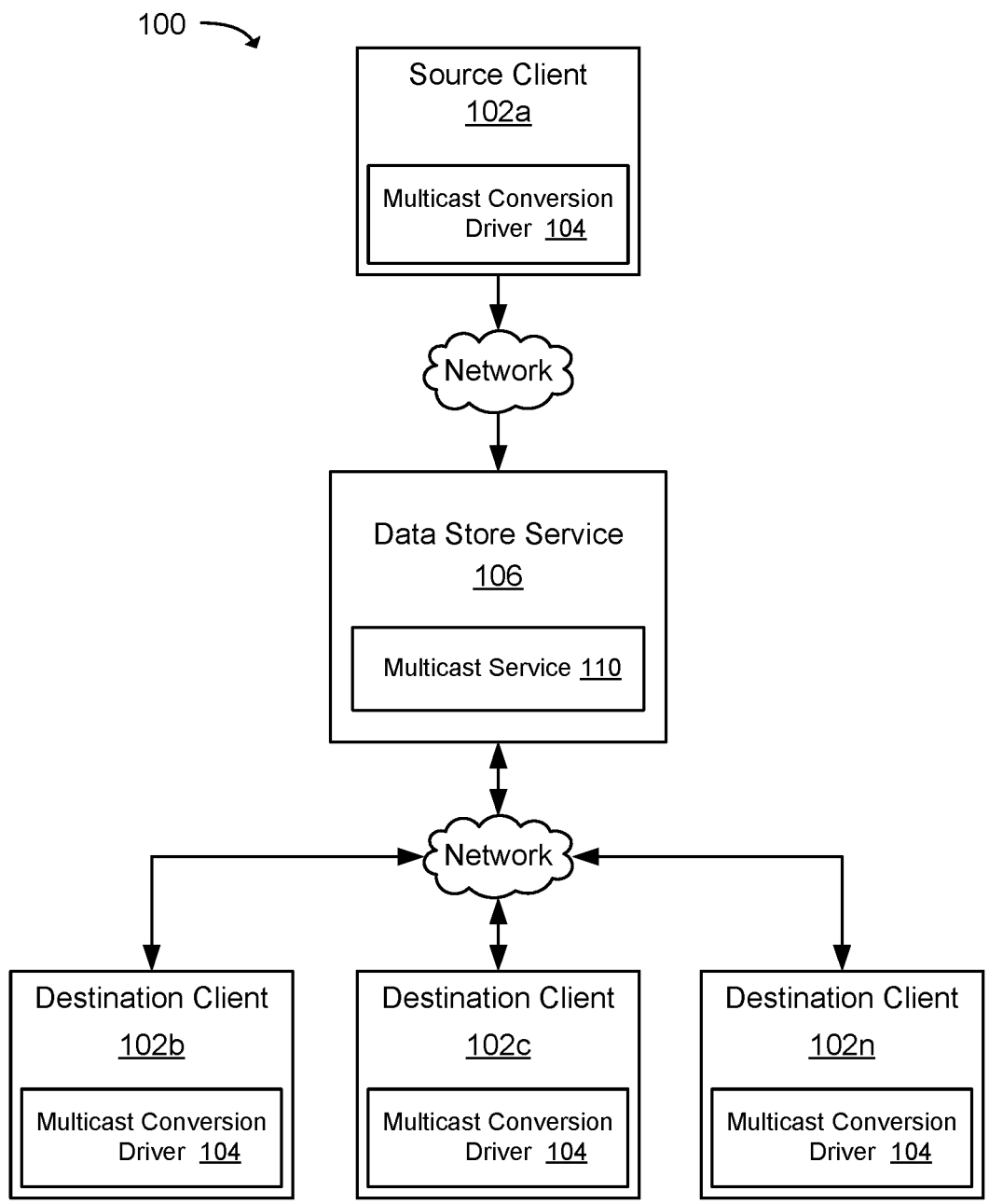
FIG. 1 is a block diagram illustrating an example system for emulating a multicast network using a multicast conversion driver and a data store service.

A technology is described for emulating a multicast network using a data store service and a multicast conversion driver installed on source clients and destination clients. A source client may be a sender of a multicast group communication and a destination client may be a recipient of the multicast group communication. The multicast conversion driver on a source client may be configured to convert a multicast network communication (e.g., a multicast packet sent to a network interface or network driver) into a data transaction request format and send the data transaction request to the data store service (e.g., an object data store service, a NoSQL data store service, or a relational data store service), and the multicast conversion driver on a destination client may be configured to extract a multicast network packet from a data record sent by the data store service to the destination client.

As an illustration of the technology, the multicast conversion driver executing on a source client may receive a multicast network packet from the application layer (in the Open Systems Interconnection (OSI) model) and encapsulate the multicast network packet in a data transaction request (e.g., a data write request) that can be understood by a data store service. For example, the multicast network packet may be encapsulated in the data transaction request using a data interchange format, such as JavaScript Object Notation (JSON) or Extensible Markup Language (XML). The data transaction request may be sent to the data store service via a computer network. The data store service may receive the data transaction request and process the data transaction request. In processing the data transaction request, a multicast identifier (e.g., a multicast IP address) included in the data transaction request may be identified and may indicate to the data store service that the data transaction request is a multicast distribution request.

In one example configuration, in response to the multicast distribution request, the data store service may identify destination clients that are subscribed to receive multicast network communications addressed to a particular multicast identifier (e.g., multicast IP address). In subscribing to the multicast IP address, the multicast conversion driver executing on a client may convert the subscription request to a data store subscription request and send the subscription request to the data store service, which may keep a record of subscribed destination clients. Having identified the destination clients subscribed to receive the multicast network packet, the data store service may distribute the multicast network packet to the destination clients by sending each of the destination clients a copy of a data record containing the network packet. In receiving the data record at a destination client, the multicast conversion driver executing on the destination client extracts the network packet from the data record and provides the network packet to the application layer on the destination client.

In another example configuration, the data store service may store a network packet in a data store in response to receiving the multicast distribution request included in the data transaction request sent by a source client. Destination clients included in a multicast group may poll the data store service for multicast network communications that have been received at the data store service. For example, the data store service may act as an intermediary for destination clients and the multicast conversion driver executing on the destination clients may be configured to poll the data store service by periodically requesting multicast network packets received by the data store service. In response to a polling request made by a destination client, the data store service may send a copy of a data record containing a network packet to the destination client and the multicast conversion driver on the destination client may extract the network packet from the data record and provide the network packet to the application layer on the destination client.

The technology may provide advantages in scenarios where IP multicast may not be available or may not be enabled and clients within a group of clients may have a need to communicate with one another. For example, clients that negotiate for an IP address (e.g., load balancing or round robin distribution), clients that report a health status, or clients that perform data synchronization may use the technology to send and receive multicast group communications.

FIG. 1 is a block diagram illustrating a high level example of a system 100 that may be used to emulate a multicast network using a multicast conversion driver 104 and a data store service 106. As illustrated, the system 100 may include clients 102a-n that send and receive multicast network communications. The clients 102a-n may include services, virtual devices, computing instances, and/or computing devices that are in communication with the data store service 106 via a network. While four clients 102a-n are shown, the system 100 may include any number of clients 102a-n. A client 102a-n may both send and receive multicast network communications. The data store service 106 may be a high availability data service, such as a NoSQL (non-relational) data store service that supports document store models (storing of semi-structured data as documents (e.g., JSON or XML formats)) and key-value data store models.

The clients 102a-n may include a multicast conversion driver 104 used as part of emulating a multicast network. The multicast conversion driver 104 may be configured to convert multicast group communications generated by the clients 102a-n to a data transaction request format (e.g. a write request) that is understood by the data store service 106, and extract multicast group communications from data records received at the clients 102a-n. In one example, the multicast conversion driver 104 may be registered with a client 102a-n as a network interface controller (e.g., an additional network interface controller) that exclusively handles multicast network communications. For example, network packets sent or received by a client 102a-n having a destination multicast IP address (e.g., 239.x.x.x) may be provided to the multicast conversion driver 104. In another example, the multicast conversion driver 104 may be an application plug-in to an existing network interface controller on a client 102a-n. Network packets addressed to a destination multicast IP address may be handled by the application plug-in. Applications executing on the clients 102a-n may be unaware that multicast network communications sent or received by the applications are converted to and from a data store communication format using the multicast conversion driver 104.

In one example, the clients 102a-n may join a multicast network group by sending a request to a multicast service 110 hosted by the data store service 106. For example, a client 102a-n may send a join request using the Internet Group Management Protocol (IGMP), which is a communications protocol used by hosts and routers to establish multicast group memberships. The join request may be provided to the multicast conversion driver 104 that, in one example, emulates an IGMP join request by converting the join request to a data store subscribe request and sends the data store subscribe request to a data store service 106 that supports data subscription services. The multicast service 110 may be configured to add information for the subscribing client 102a-n, such as a source IP address, to multicast subscription records identified by a multicast group IP address (e.g., 239.x.x.x). Multicast network communications addressed to the multicast group IP address may be sent (e.g., pushed) from a client that is a source client 102a to the subscribed clients 102b-n.

In another example involving a data store service 106 that does not support a subscription service, a join request (e.g., via IGMP) received at the multicast conversion driver 104 may be converted by the multicast conversion driver 104 into a data store polling function managed by the multicast conversion driver 104 that periodically polls the data store service 106 for data records associated with a multicast group IP address. Subscribing to and polling the data store service 106 for multicast network communications are described in greater detail later in association with FIG. 3.

To illustrate interactions that may occur between the clients 102a-n and the data store service 106, FIG. 1 shows a source client 102a that sends multicast network communications to a number of destination clients 102b-n using the multicast conversions driver 104 and the data store service 106. In one example, the source client 102a having the multicast conversion driver 104 installed on the source client 102a may send a multicast network communication to the destination clients 102b-n that also have the multicast conversion driver 104 installed on the destination clients 102b-n. In sending the multicast network communication, a network packet addressed to a multicast IP address (e.g., 239.x.x.x) may be provided from the application layer of the source client 102a to the multicast conversion driver 104 on the source client 102a. The application layer is a layer in the OSI model and in the TCP/IP protocol suite. The application layer includes protocols that focus on process-to-process communication across an IP network and provides a communication interface and end-user services.

The multicast conversion driver 104 on the source client 102a may prepare the network packet for multicast distribution to the destination clients 102b-n by placing the network packet in a data transaction request format that preserves the network packet and the multicast addressing information. For example, the multicast conversion driver 104 may be configured to generate a data write request that includes the network packet as a data record that can be written to a data store managed by the data store service 106. In some examples, the multicast conversion driver 104 may encapsulate the network packet in a data interchange format, such as JSON or XML. In other examples, the multicast conversion driver 104 may place the network packet in a binary data field. In an additional example, each field in the network packet may be converted to a field in a data store. Also, in some examples, multiple network packets may be packaged in a single data transaction request. After the network packet has been placed in the data transaction request, the multicast conversion driver 104 may be configured to send the data transaction request to the data store service 106.

In receiving the data transaction request at the data store service 106, the data transaction request may be processed and the data record containing the network packet may be stored to a data store managed by the data store service 106. In processing the data transaction request, the multicast service 110 hosted by the data store service 106 may be configured to analyze the data transaction request and/or the data record included in the data transaction request to determine whether the data transaction request may be associated with a multicast network communication. For example, the data transaction request may be analyzed to identify a multicast identifier in the data transaction request that indicates to the multicast service 110 that the data transaction request is a multicast distribution request. The multicast identifier may be a multicast IP address or some other identifier (e.g., a keyword, token, etc.) used to classify the data transaction request as a multicast distribution request. As a specific example, a key (e.g., a unique key or a key-value pair) included in the data transaction request may include a multicast IP address. The multicast service 110 may recognize the multicast IP address included in the key and process the data transaction request as a multicast distribution request.

In a first example configuration, after a data transaction request has been identified as a multicast distribution request, the data record included in the data transaction request that includes the network packet may be distributed to destination clients 102b-n that may be subscribed to receive multicast group communications associated with the multicast IP address. In a second example configuration, the destination clients 102b-n may poll the data store service 106 for the data record containing the network packet.

In the first example configuration, the multicast service 110 may be configured to identify the destination clients 102b-n subscribed to receive multicast network communications from the multicast IP address. In one example, a multicast subscription record may be queried to obtain the identities of the destination clients 102a-n. For example, the multicast subscription record may be queried using the multicast IP address included in the data transaction request to obtain IP addresses for the destination clients 102a-n.

The multicast service 110 may be configured to send a copy of the data record containing the network packet to each client 102b-n subscribed to receive multicast network communications associated with the multicast IP address except for the source client 102a that sent the data transaction request. For example, the source client 102a that sent the data transaction request containing the multicast network packet may also be subscribed to receive multicast network communications associated with the multicast IP address. As such, a source client identifier (e.g., a source client IP address) for the source client 102a may be used to ensure that a copy of the data record containing the network packet is not sent back to the source client 102a. For example, a key included in the data transaction request may include a source client identifier that can be used to ensure that the source client 102a does not receive a copy of the data record sent by the source client 102a.

The multicast conversion driver 104 on a destination client 102b-c may receive the data record containing the network packet sent by the source client 102a. For example, the multicast conversion driver 104 may be configured to handle network communications received from the data store service 106 (e.g., the multicast conversion driver 104 acts as an additional network interface controller), or network communications received at a destination client's network interface controller may be analyzed and passed to the multicast conversion driver 104 when determined that a network communication is intended to be handled by the multicast conversion driver 104 (e.g., the multicast conversion driver 104 may be an application plug-in to a destination client's network interface controller).

The multicast conversion driver 104 may be configured to extract the network packet from the data record and provide the network packet to the application layer in the OSI model. As a non-limiting example, the network packet may be encapsulated in the data record in an interchange format, such as JSON or XML, or the data record may contain the network packet in a binary data field. The multicast conversion driver 104 may be configured to extract the network packet from an interchange formatted file or from a binary data field, wherein the network packet may be in the original IP packet format generated by the source client 102a and the network packet may be passed to the application layer of the destination client 102b-n. Namely, the network packet can be delivered to the application layer on the destination client 102b-n as though the network packet had been sent to the destination client 102b-n via a traditional multicast network.

In the second example configuration, destination clients 102b-n may poll the data store service 106 for data records containing network packets associated with a particular multicast IP address. More specifically, the multicast conversion driver 104 executing on a destination client 102b-n may be configured to poll the data store service 106 by sending read data transaction requests to the data store service 106 for data records associated with a multicast IP address. A read data transaction request sent by a destination client 102b-n may include additional parameters used to identify a particular data record, such as a time boundary, or packet sequence number. For example, a time boundary may be used in a read data transaction request by asking for data records associated with a multicast IP address that have been received at the data store service 106 since the last read data transaction request was made by the destination client 102b-n, or the read data transaction request may ask for data records received at the data store service 106 within a past number of milliseconds (e.g., 50, 100, 200 milliseconds).

The data store service 106 may respond to a read data transaction request by identifying a data record that corresponds to the read data transaction request and sending the data record to the destination client 102b-n that made the read data transaction request. After receiving the data record from the data store service 106, the multicast service 110 may extract the network packet from the data record and provide the network packet to the application layer as described above.

Figure 2:
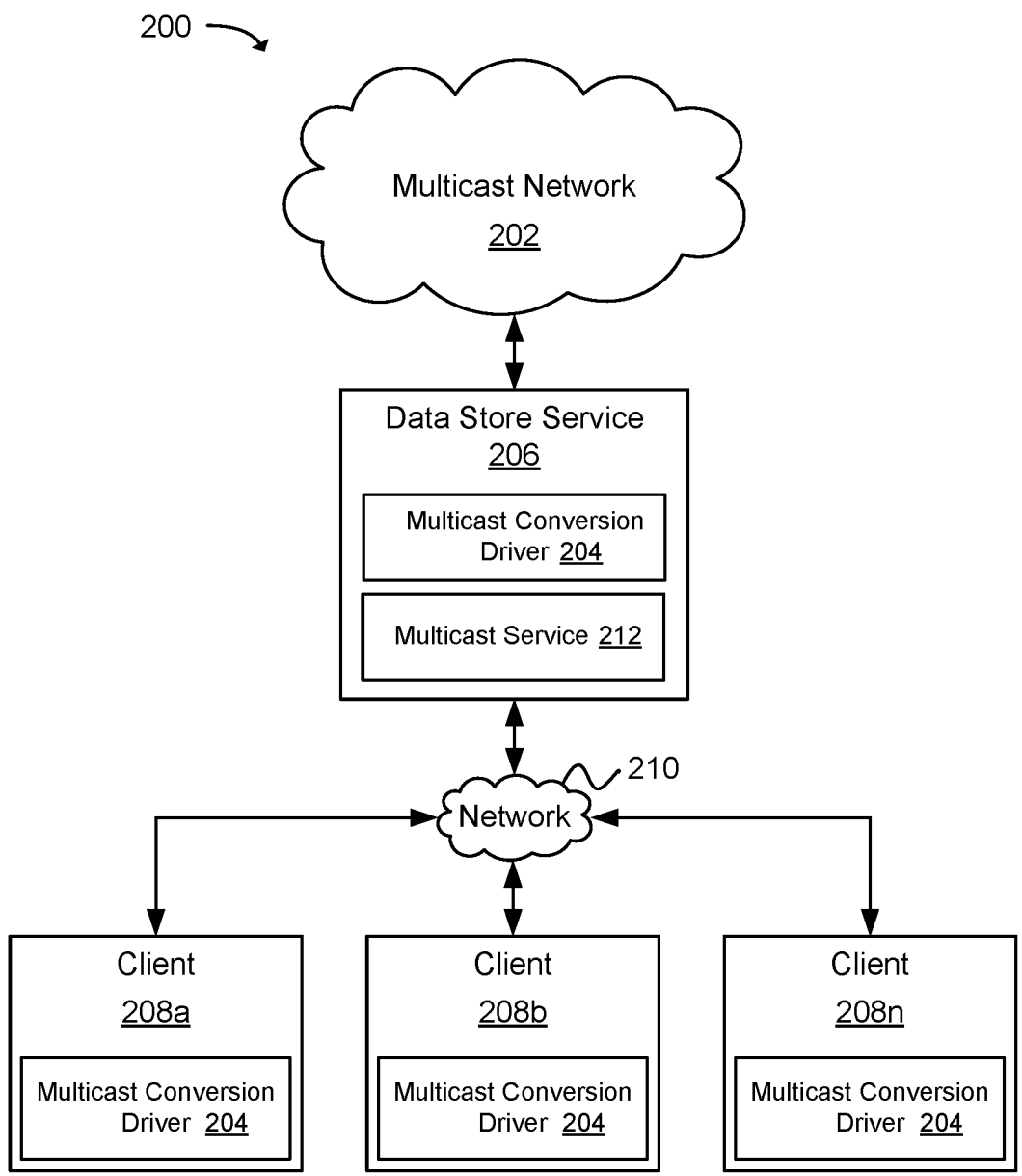
FIG. 2 is a block diagram that illustrates an example system for emulating a multicast node that receives and sends multicast network communications on behalf of clients.

FIG. 2 is a block diagram illustrating a high level example of a system 200 that may be used to emulate a multicast node that may receive multicast network communications from a multicast network 202 and send multicast network communications out to the multicast network 202. Illustratively, the multicast protocol may be unreliable on some computer networks, or the multicast protocol may not be enabled on some computer networks. The present technology may be used to bypass the situation where multicasting is unusable by emulating a multicast network node where multicast network packets may be placed in data transaction requests and sent over a network 210 to an actual multicast network 202, or to clients 208a-n subscribed to the multicast network 202.

In one example, a data store service 206 may act as an intermediary for one or more clients 208a-n that send and/or receive multicast network communications. The data store service 206 may be joined to a multicast network 202 using IGMP. For example, an IP address for the data store service 206 may be added to a multicast group using IGMP. As an illustration, a client 208a-n that would like to join a multicast network group may send an IGMP request to the data store service 206 via a multicast conversion driver 204 executing on the client 208a-n. The multicast conversion driver 204 may be configured to convert, or encapsulate the IGMP request in a data transaction request (e.g., a write data transaction request) and send the data transaction request to the data store service 206. The data store service 206 may receive the data transaction request that includes the IGMP request and extract the IGMP request from a data record included in the data transaction request using a copy of the multicast conversion driver 204 included in the data store service 206. The data store service 206 may then join the multicast network 202 using the IGMP request extracted from the data transaction request. Clients that join the multicast network 202 may be added to a subscription record managed by the data store service 206 that identifies clients 208a-n subscribed to receive multicast network communications that are passed through the multicast network 202.

After joining the multicast network 202, multicast communications may be routed through the data store service 206. The data store service 206 may convert the multicast communications to/from data transaction requests using the multicast conversion driver 204. For example, the data store service 206 may receive network packets from the multicast network 202 for distribution to the clients 208a-n. The network packets may be provided to the multicast conversion driver 204, which may be configured to create data records containing the network packets.

In one example, the data records containing the network packets may be sent to the clients 208a-n subscribed to receive multicast communications associated with the network packets. For example, the data store service 206 may include a multicast service 212 configured to identify clients 208a-n subscribed to receive the multicast communications and send the data records containing the network packets to the clients 208a-n. The clients 208a-n that receive the network packets may have the multicast conversion driver 204 installed on the clients 208a-n. The multicast conversion driver 204 may be used to extract the network packets from the data records and provide the network packets to the application layer.

In another example, clients 208a-n subscribed to receive multicast communications from the multicast network 202 may poll the data store service 206 for data records containing network packets received at the data store service 206 from the multicast network 202. For example, the multicast conversion driver 204 may be used to periodically request a data record from the data store service 206 that contains a network packet received from the multicast network 202. In the case that a data record containing a network packet received from the multicast network 202 exists, the data store service 206 may respond to the request by sending the data record to the client 208a-n. In the case that no multicast communication has been received from the multicast network 202, the data store service 206 may respond to the request by informing the client 208a-n that the data record does not exist.

Figure 3:
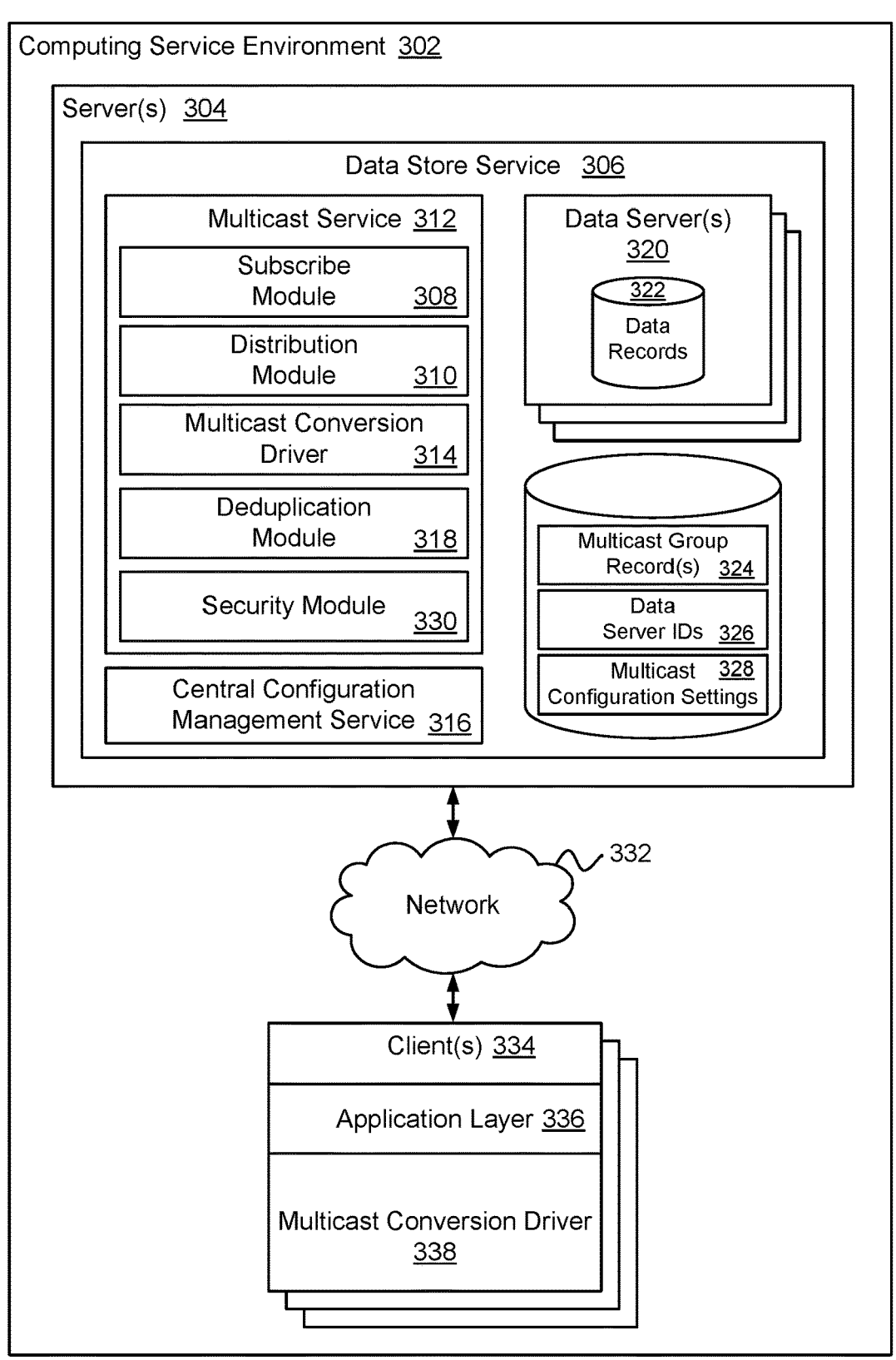
FIG. 3 is a block diagram that illustrates various example components included in a system for emulating a multicast network.

FIG. 3 illustrates components of an example system environment 300 on which the present technology may be executed. The system environment 300 may include a computing service environment 302 that includes servers 304 used to execute computing instances (e.g., virtual machines), which may be an instance of a software implementation of a machine (i.e. a computer) that executes applications like a physical machine. A server 304 may execute a data store service 306 (via one or more computing instances) configured to manage a number of data servers 320 that deliver data services such as data storage, data analysis, data manipulation, data archiving, and other services using a client/server architecture. A data store service 306 may include an object storage service, a NoSQL data store service, or a relational data store service. The data store service 306 may provide data storage through a web services interface, such as a Representational state transfer (REST) interface or a Simple Object Access Protocol (SOAP) interface.

The data store service 306 may host other services. In particular, the data store service 306 may host a multicast service 312 used to emulate a multicast network, and a central configuration management service 316 used to manage multicast configuration settings 328 for multicast conversion drivers 314/338 and push the multicast configuration settings 328 to the multicast conversion drivers 314/338. The multicast service 312 may include a number of modules used in emulating a multicast network. In one example, the multicast service 312 may include a subscribe module 308 and a distribution module 310. The multicast service 312 may also include a multicast conversion driver 314 that may be similar to, or the same as, the multicast conversion driver 338 used by clients 334. The multicast conversion driver 314 included in the multicast service 312 may be used as described in FIG. 2, where the data store service 306 acts as an intermediary for clients 334 and uses the multicast conversion driver 314 to convert multicast communications received from a multicast network to a data record and sends/provides the data record to the clients 334. Also, the multicast conversion driver 314 may be used to extract multicast requests/data from data records received at the data store service 306.

In one example, receiving a multicast network packet from the application layer 336 of a source client 334 or from an actual source multicast network may cause the multicast conversion driver 314/338 to extract IP header options out of the network packet and encapsulate the datagram of the network packet in a data record included in a data transaction request. Receiving a data transaction request that includes a data record containing a multicast network packet at a destination client 334 may cause the multicast conversion driver 338 to extract the network packet from the data record and set the values of the network packet header to values that correspond with a multicast network packet received at a destination client 334 and provide the network packet to the application layer 336 of the client 334.

The subscribe module 308 may be configured to handle multicast subscription requests made by clients 334. A subscription request made by a client 334 may be a request to join an emulated multicast network, or a request to join an actual multicast network. In making a subscription request, a multicast conversion driver 338 included on a client 334 may convert an IGMP request to a data transaction request, for example, by encapsulating the IGMP request in a data record. An indicator may be included in the data transaction request that signals to the data store service 306 that the data transaction request is associated with a multicast request. For example, a key included in the data transaction request may include a multicast IP address or token that indicates that the data transaction request is associated with a multicast request.

After receiving the data transaction request, the data record included in the data transaction request may be provided to the multicast service 312 and the multicast conversion driver 314 may be used to extract the IGMP request from the data record and provide the IGMP request to the subscribe module 308. An IGMP request may include a multicast group address for the multicast group being joined, and a network address for the client 334 requesting to join the multicast group. In the case that the client 334 is joining an emulated multicast group, the subscribe module 308 may add the network address of the client 334 to a multicast group record 324 for the multicast group used to identify clients 334 that are members of the multicast group. Thereafter, the client 334 may receive multicast communications addressed to the multicast group. In the case that the client 334 is joining a non-emulated multicast group, the subscribe module 308 may be configured to create a new IGMP request that substitutes the network address of the client 334 with a network address associated with the data store service 306, and send the IGMP request to an actual multicast network. Thereafter, the data store service 306 may act as an intermediary for the client 334 and may receive and send multicast communications associated with the multicast group.

The distribution module 310 may be configured to identify a data server 320 that may be available to process a data transaction request associated with a multicast communication, and the distribution module 310 may distribute a data record associated with the multicast communication. A data transaction request received at the data store service 306 may be identified as being associated with a multicast communication (e.g., via a unique key or key-value pair) and the data transaction request may be provided to the multicast service 312, which may use the distribution module 310 to identify a data server 320 and assign the data server 320 to process (e.g., read or write) the data transaction request.

A data server 320 assigned a data transaction request associated with a multicast communication may process the data transaction request (e.g., write a data record 322 containing a multicast network packet to storage or read a data record 322 containing a multicast network packet stored in storage). In the case that the data store service 306 may be configured to push data records to clients 334, the data server 320 may send a data record 322 containing a multicast network packet to clients 334 that are subscribed to receive the multicast network packet. For example, IP addresses for clients 334 subscribed to a multicast group may be obtained from a multicast group record 324 and copies of a data record 322 containing a multicast network packet may be sent to the clients 334.

Various techniques may be used to distribute data transaction requests to the data servers 320. In one example, a hashing technique that maps a hash value to a data server 320 (e.g., a data server ID 326) may be used to distribute data transaction requests to the data servers 320, as described in greater detail in association with FIG. 5. In another example, a round robin distribution technique may be used to distribute data transaction requests to the data servers 320. Individual data servers 320 may be assigned to handle data transaction requests associated with individual multicast groups. For example, one or more data servers 320 may be assigned to a multicast group by mapping a multicast IP address for the multicast group to the one or more data servers 320.

In the case that the system environment 300 includes many clients 334 that are sending and receiving multicast communications, or are polling the data store service 306 for data records containing multicast communications, the data store service 306 may be scaled up or down accordingly. For example, the data store service 306 may be scaled by increasing or decreasing a number of data servers 320 included in the data store service 306 according to a number of data transaction requests received from clients 334 that are associated with multicast requests. The data servers 320 may be scaled to be close in proximity to one another and to decrease latency in synchronizing (e.g., replicating) data records 322 between the data servers 320.

In the case that the data store service 306 receives a stream of data transaction requests containing network packets included in a multicast data stream, such as a multimedia data stream, that involves multiple clients 334 (e.g., hundreds or thousands of clients 334), the stream of data transaction requests may be distributed (e.g., via sharding) to a plurality of data servers 320 that may be available to process the data transaction requests. For example load balancing may be performed that distributes the stream of data transaction requests among the data servers 320.

In cases where the timing of a multicast communication may be relevant, such as a live video stream, where destination clients 334 should receive multicast network packets at substantially the same time, timing techniques may be used to deliver/provide the network packets to the destination clients 334. As an example, a packet arrival time or packet release time may be included in a data transaction request and used to allow distribution of a data record 322 containing a multicast network packet to intended destination clients 334. As another example, data records 322 received at a client 334 may include a timestamp indicating when a network packet included in the data record 322 may be released to the application layer 336 of the client 334. For example, a network packet extracted from a data record 322 may be cached on a client 334 until a time indicated by the timestamp that allows the network packet to be pushed to the application layer 336.

A central configuration management service 316 may be used to orchestrate the interaction of clients 334 (via the multicast conversion driver 338) with the data store service 306. For example, the central configuration management service 316 may be used to distribute multicast configuration settings 328 to the multicast conversion drivers 338 executing on the clients 334. The multicast configuration settings 328 may be used by the multicast conversion driver 338 to send and receive data transaction requests. Non-limiting examples of multicast configuration settings 328 may include: an IP address for a data server 320 assigned to a client 334, a request format used for data transaction requests, a data record structure used to encapsulate network packets, polling mechanisms used to poll the data store service 306 for multicast communications, as well as other multicast configuration settings 328.

In one example, the central configuration management service 316 may be used to manage multicast communication related loads on data servers 320 by instructing multicast conversion drivers 338 on the clients 334 to update multicast configuration settings 328 used by the multicast conversion drivers 338. As an illustration, as multicast communication related loads on existing data servers 320 increase, the central configuration management service 316 may be used to instruct some multicast conversion drivers 338 to begin sending data transaction requests related to multicast communications to a specified newly launched data server 320, thereby decreasing the loads on the other data servers 320.

In some examples, the multicast service 312 may be configured to perform functions related to multicast communications, such as deduplication and security. For example, the multicast service 312 may include a deduplication module 318 configured to de-duplicate data transaction requests and/or data records 322 related to multicast communications. For example, currently received data transaction requests and/or data records 322 may be compared to previously received data transaction requests and/or data records 322 (e.g., using a hash table), and if already received, the duplicate data transaction request and/or data record 322 may be discarded. Compression might also be applied to the network packets, if desired. The security module 330 may be configured to perform security functions, such as validating the identity of clients 334 and detecting whether data transaction requests related to multicast communications may be associated with malicious network activity, such as a Distributed Denial of Service (DDoS) attack.

A client 334 may include services and virtual devices that execute on computing instances within the computing service environment 302. As an illustration, a client 334 may be a service, such as a load balancer service, application firewall service, or other service that synchronizes state information with one another using a multicast protocol. Alternatively, a client 334 may comprise a physical device, for example, a processor-based system such as a computing device that includes the multicast conversion driver 338. A client 334 may include the multicast conversion driver 338 configured to convert (encapsulate) multicast communications into data transaction requests sent to the data store service 306 and extract multicast communications from data records 322 received from the data store service 306. Multicast communications sent by a client 334 may be provided by the application layer 336 in the OSI model to the multicast conversion driver 338, and multicast communications received by a client 334 may be received at the multicast conversion driver 338 and passed to the application layer 336.

The various processes and/or other functionality contained within the system environment 300 may be executed on one or more processors that are in communication with one or more memory modules. The system environment 300 may include a number of computing devices that are arranged, for example, in one or more server banks or computer banks or other arrangements. The computing devices may support a computing environment using hypervisors, virtual machine monitors (VMMs), and other virtualization software.

Data (e.g., data records 322, multicast group records 324, data server IDs 326, multicast configuration settings 328, etc.) utilized by the different components included in the system environment 300 may be stored on one or more data stores. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the modules and services included in the computing service environment 302 may be implemented according to different technologies, including, but not limited to, REST and SOAP. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The network 332 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 3 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 3 illustrates an example of a system that may implement the techniques above, many other similar or different environments are possible. The example environments discussed and illustrated above are merely representative and not limiting.

Figure 4:
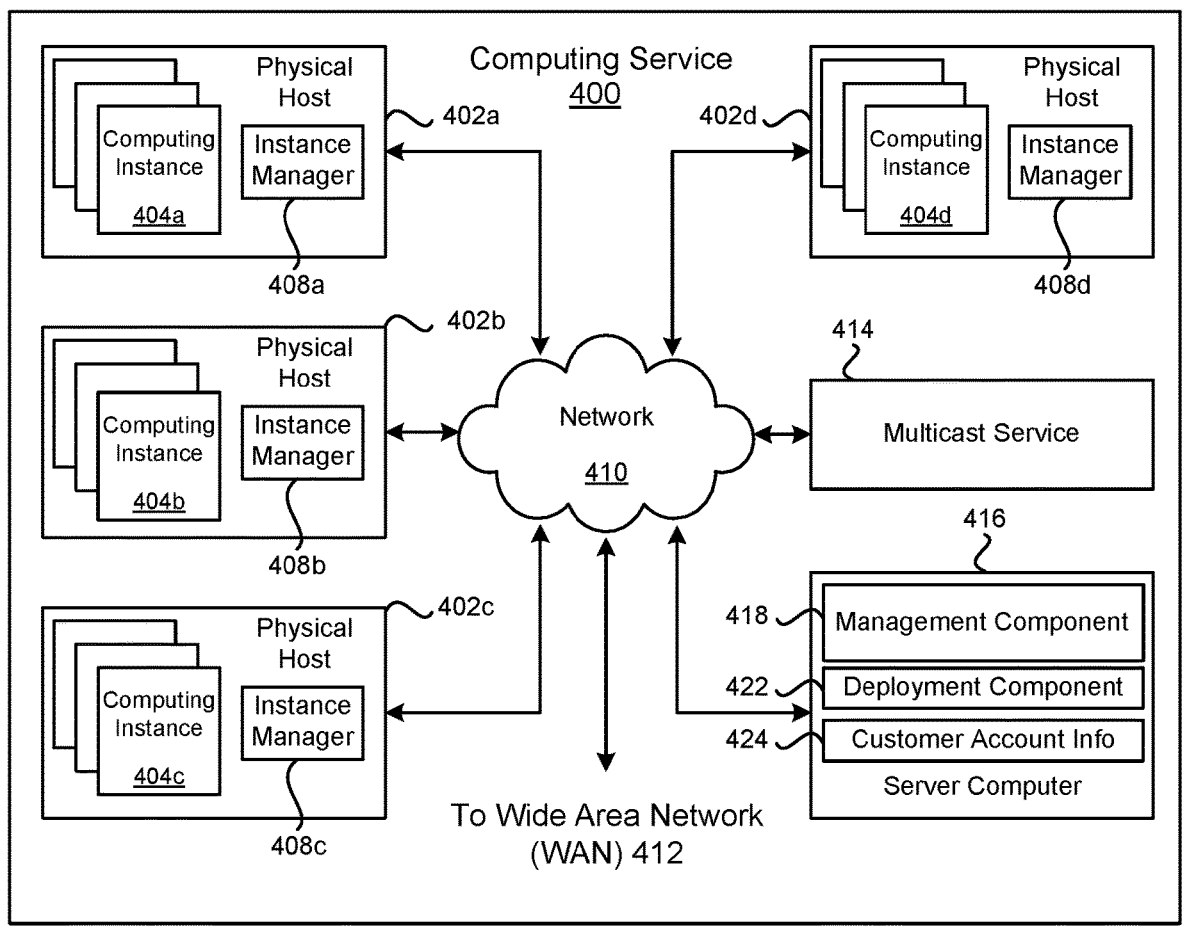
FIG. 4 is a block diagram illustrating an example computing service environment that includes a multicast service.

FIG. 4 is a block diagram illustrating an example computing service 400 that may be used to execute and manage a number of computing instances 404a-d. In particular, the computing service 400 depicted illustrates one environment in which the technology described herein may be used. The computing service 400 may be one type of environment that includes various virtualized service resources that may be used, for instance, to host computing instances 404a-d.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Those familiar with the art will recognize that the computing service 400 may be described as a "cloud" environment.

The particularly illustrated computing service 400 may include a plurality of server computers 402a-d. While four server computers are shown, any number may be used, and large data centers may include thousands of server computers. The computing service 400 may provide computing resources for executing computing instances 404a-d. Computing instances 404a-d may, for example, be virtual machines. A virtual machine may be an instance of a software implementation of a machine (i.e. a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

One or more server computers 414 and 416 may be reserved to execute software components for managing the operation of the computing service 400 and the computing instances 404a-d. For example, a server computer 414 may execute a multicast service used to emulate a multicast network as described earlier.

A server computer 416 may execute a management component 418. A customer may access the management component 418 to configure various aspects of the operation of the computing instances 404a-d purchased by a customer. For example, the customer may setup computing instances 404a-d and make changes to the configuration of the computing instances 404a-d.

A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache should be prepared, and other types of information. The deployment component 422 may utilize the customer-provided configuration and cache logic to configure, prime, and launch computing instances 404a-d. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402a-d, 416. The network 410 may be a local area network (LAN) and may be connected to a Wide Area Network (WAN) 412 or the Internet, so that end customers may access the computing service 400. The network topology illustrated in FIG. 4 has been simplified, many more networks and networking devices may be utilized to interconnect the various computing systems disclosed herein.

Figure 5:
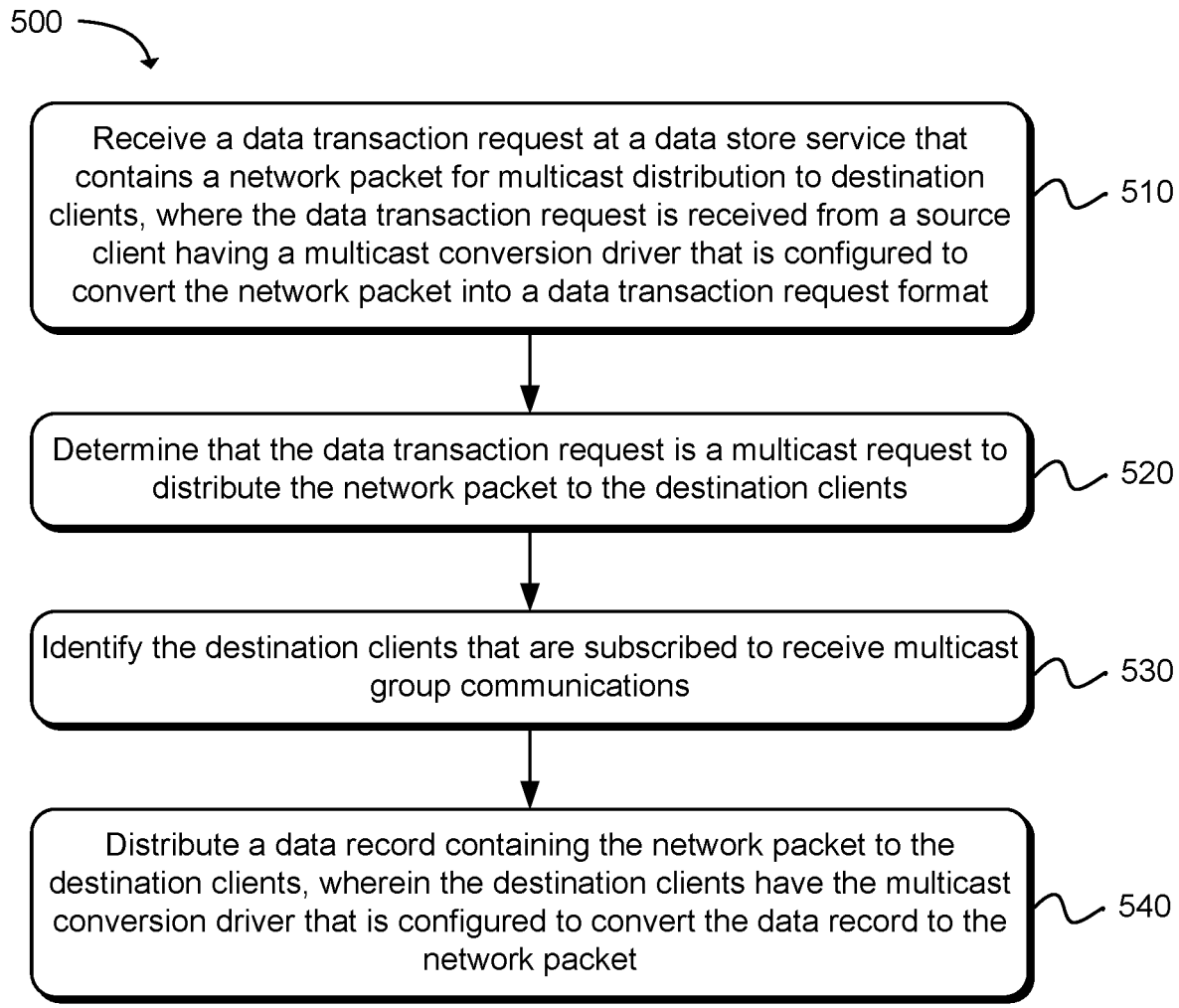
FIG. 5 is a flow diagram that illustrates an example method for emulating a multicast network using a data store service and a multicast conversion driver that executes on clients.

Moving now to FIG. 5, a flow diagram illustrates an example method 500 for emulating a multicast network using a data store service and a multicast conversion driver that executes on clients. In this example method 500, the data store service may be configured to push data records containing multicast network packets received from source clients to destination clients. Starting in block 510, a data transaction request may be received at a data store service that contains a network packet for multicast distribution to destination clients, where the data transaction request may be received from a source client having a multicast conversion driver that may be configured to convert the network packet into a data transaction request format.

Source clients and destination clients may include services and/or computing devices that are included in a multicast network group that may be defined using a multicast group address (e.g., 224.x.x.x). Typically, any client included in the multicast network group may send and receive multicast communications to other client members of the group. As such, a client may be a source client that sends out a multicast group communication to destination clients, and a client may be a destination client that receives a multicast group communication from a source client.

A multicast conversion driver used in emulating a multicast network may be loaded on the clients. The multicast conversion driver may be implemented on clients having various operating systems. The multicast conversion driver may be configured to package a multicast network packet received from the application layer of a client in a data transaction request (e.g., a write request) sent over a network, and may be configured to extract a multicast network packet from a data record included in a data transaction request (e.g., a read request) and provide the network packet to the application layer of a client.

As in block 520, a determination may be made that the data transaction request is a multicast request to distribute the network packet to the destination clients. In one example, the data transaction request may be processed by the data store service to identify a key (e.g., a unique key or a key-value pair) that includes a multicast IP address used to distribute the network packet to the destination clients and a source client identifier for the source client. The multicast IP address included in the key may indicate to the data store service that the data transaction request is associated with a multicast group communication. In other examples, a token, keyword, or other identifier may be used to indicate to the data store service that the data transaction request is related to a multicast group communication.

After determining that the data transaction request is associated with a multicast group communication, as in block 530, destination clients subscribed to receive the multicast group communication can be identified. In one example, the multicast IP address may be used to identify destination clients that are included in a multicast group associated with the multicast IP address. As a specific example, a multicast group record managed by the data store service may be queried using a multicast group address (e.g., 224.x.x.x) to obtain an identifier (e.g., an IP address) for the destination clients that may be included in the multicast group associated with the multicast group address. A destination client having the IP address of the source client may be excluded from the group of destination clients so that the source client that sent the data transaction request is not sent a copy of the data record containing the network packet sent by the source client.

As in block 540, a data record containing the network packet may be distributed to the destination clients, wherein the destination clients have the multicast conversion driver configured to convert the data record to the network packet. In one example, the data record may be pushed to the destination clients using a push channel established to send data records to the destination clients. For example, the clients may be subscribed to the data store service to receive data records containing multicast network packets that are received at the data store service. The network packet may then be provided to the application layer of the destination clients.

Figure 6:
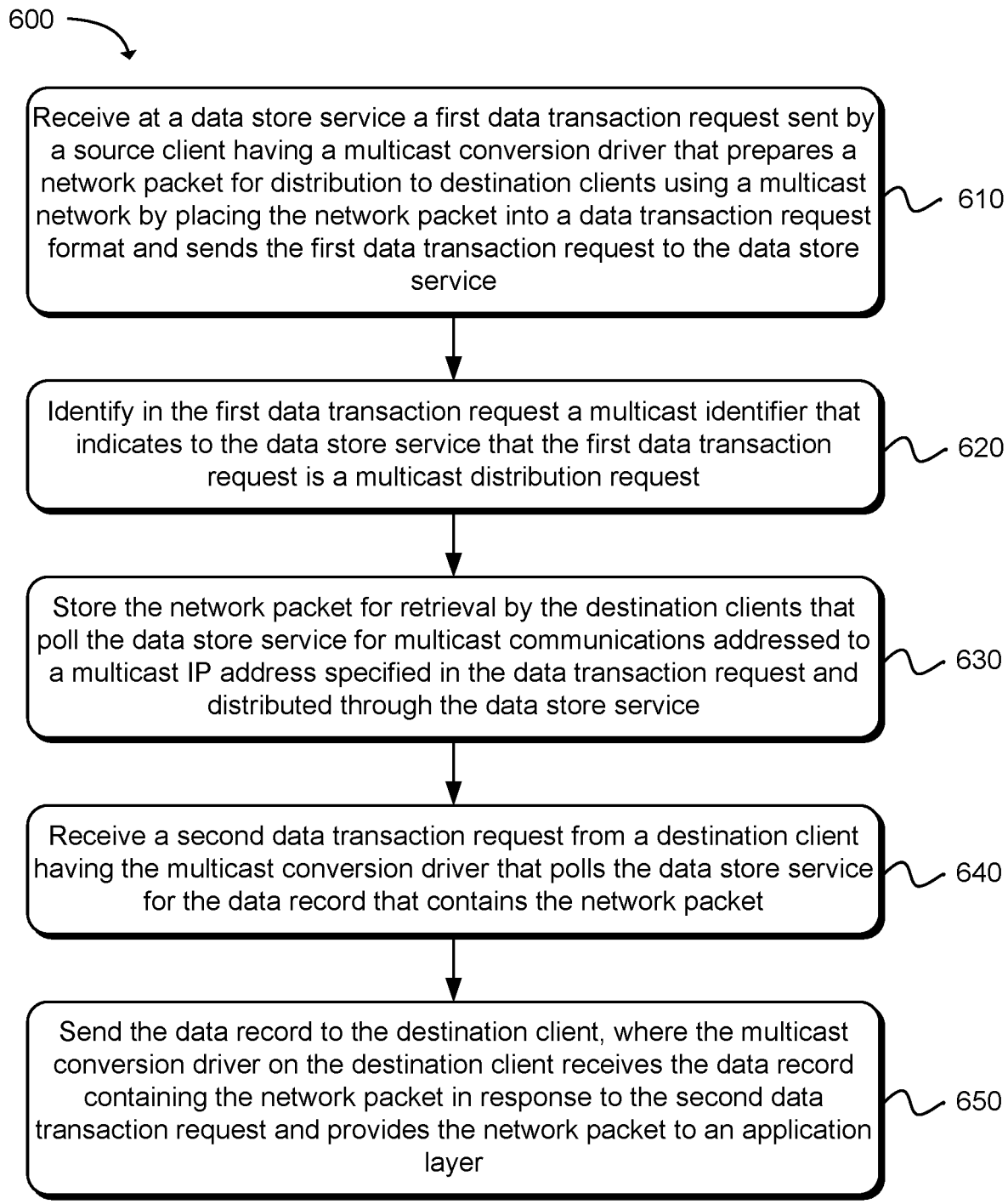
FIG. 6 is a flow diagram illustrating an example method for emulating a multicast network using a data store service and clients having a multicast conversion driver that polls the data store service for data records containing multicast network packets.

FIG. 6 is a flow diagram illustrating an example method 600 for emulating a multicast network using a data store service and a multicast conversion driver, where the clients may poll the data store service for data records containing multicast network packets. Starting in block 610, a first data transaction request may be received at a data store service where the first data transaction request may be sent by a source client having a multicast conversion driver that prepares a network packet for distribution to destination clients using a multicast network by placing the network packet into a data transaction request format and sends the first data transaction request to the data store service.

Having received the first data transaction request at the data store service, the first data transaction request may be processed, resulting in identifying in the first data transaction request a multicast identifier that indicates to the data store service that the first data transaction request is a multicast distribution request, as in block 620, and storing the network packet for retrieval by the destination clients that poll the data store service for multicast communications addressed to a multicast IP address specified in the data transaction request and distributed through the data store service, as in block 630.

As in block 640, a second data transaction request may be received from a destination client having the multicast conversion driver that polls the data store service for the data record that contains the network packet. In one example, the destination client polling the data storage service may be identified using an IP address of the destination client that may be included in the second data transaction request. Multicast groups that the destination client may be associated with may then be identified by mapping the destination client to the multicast group and the data record associated with the multicast group may be identified. In another example, the second data transaction request may include a multicast IP address that may be used to identify the data record. In some examples, the destination client may poll the data store service for new data records that have been received at the data store service since the destination client last polled the data store service. As in block 650, the data record may then be sent to the destination client, where the multicast conversion driver on the destination client receives the data record containing the network packet in response to the second data transaction request and provides the network packet to an application layer.

Figure 7:
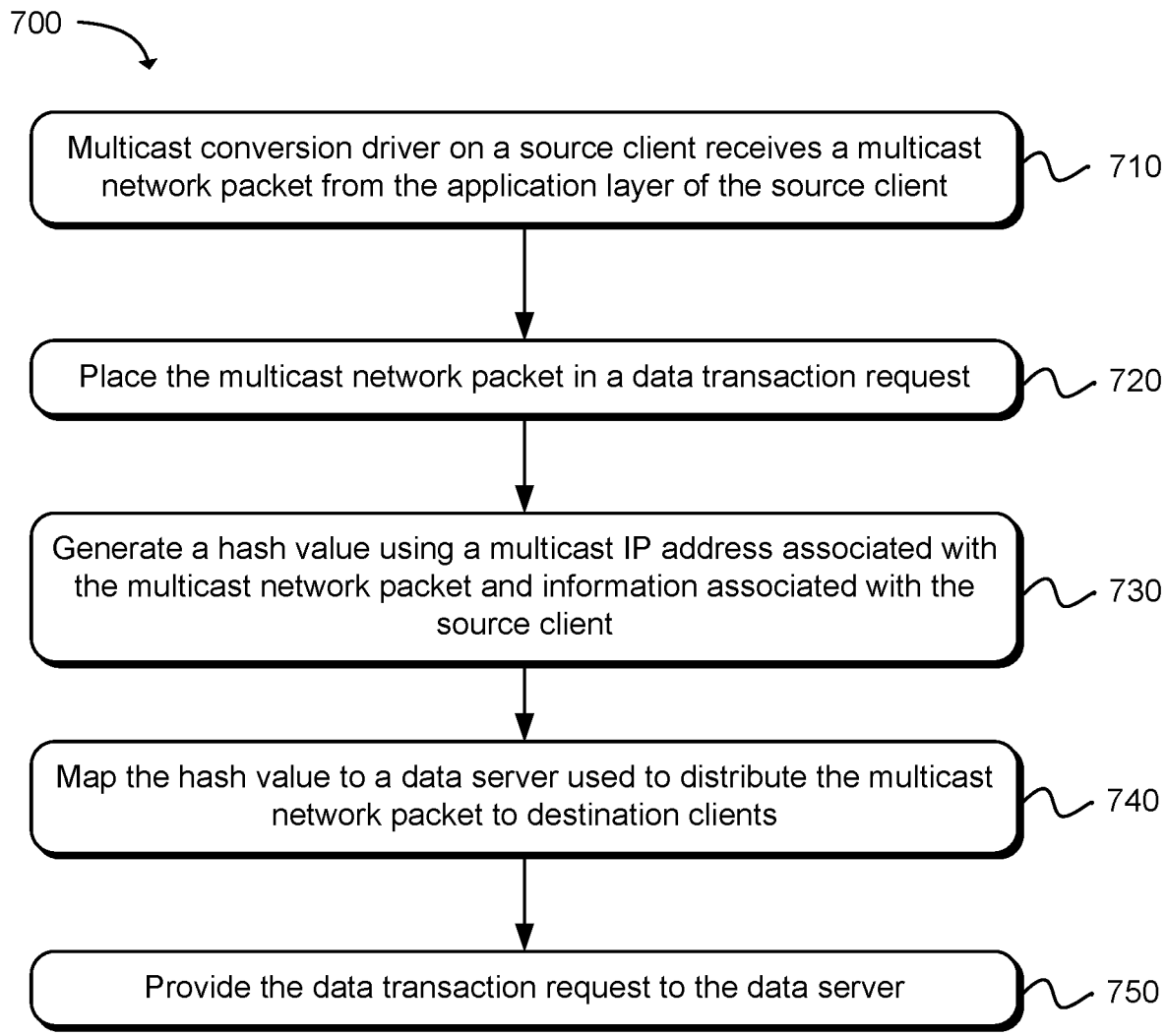
FIG. 7 is a flow diagram that illustrates an example method for distributing data transaction requests associated with multicast communications to data servers used to process the data transaction request.

FIG. 7 is a flow diagram illustrating an example method 700 for distributing data transaction requests associated with multicast communications to data servers used to process the data transaction request. In particular, the method 700 may be used in cases where a large volume of multicast communications may be handled by a data store service, such as a high availability data store service that includes multiple data servers (e.g., 20, 50, 100 or more data servers). The method 700 uses a hashing technique to generate a hash value that may be mapped to a data server assigned to process data transaction requests associated with the hash value.

As in block 710, a multicast conversion driver on a source client may receive a multicast network packet from the application layer of the source client. As in block 720, the multicast network packet may be placed in a data transaction request. For example, the data transaction request may be a write request (e.g., PUT, INSERT, UPDATE, etc.) that contains the multicast network packet.

As in block 730, a hash value may be generated using a multicast IP address associated with the multicast network packet and information associated with the source client. Illustratively, information associated with the source client may include, but is not limited to, a source client IP address and a source client port number. The multicast IP address and the source client information may be input to a hash function that generates the hash value. Any hash function may be used. Non-cryptographic hash functions may offer advantages related to an amount of processing and time needed to generate the hash value.

A data server assigned to handle the data transaction request may be identified using the hash value. As in block 740, the hash value may be mapped to a data server used to distribute the multicast network packet to destination clients. For example, a data server assignment record may be used to map the hash value to a data server (e.g., data server IP address). In one example, the data server assignment record may be located on the source client. The data server assignment record may be updated periodically. For example, the data store service may periodically send updated data server assignment records to the clients. After identifying a data server mapped to the hash value, as in block 750, the data transaction request may be sent to the data server assigned to handle the data transaction request.

Figure 8:
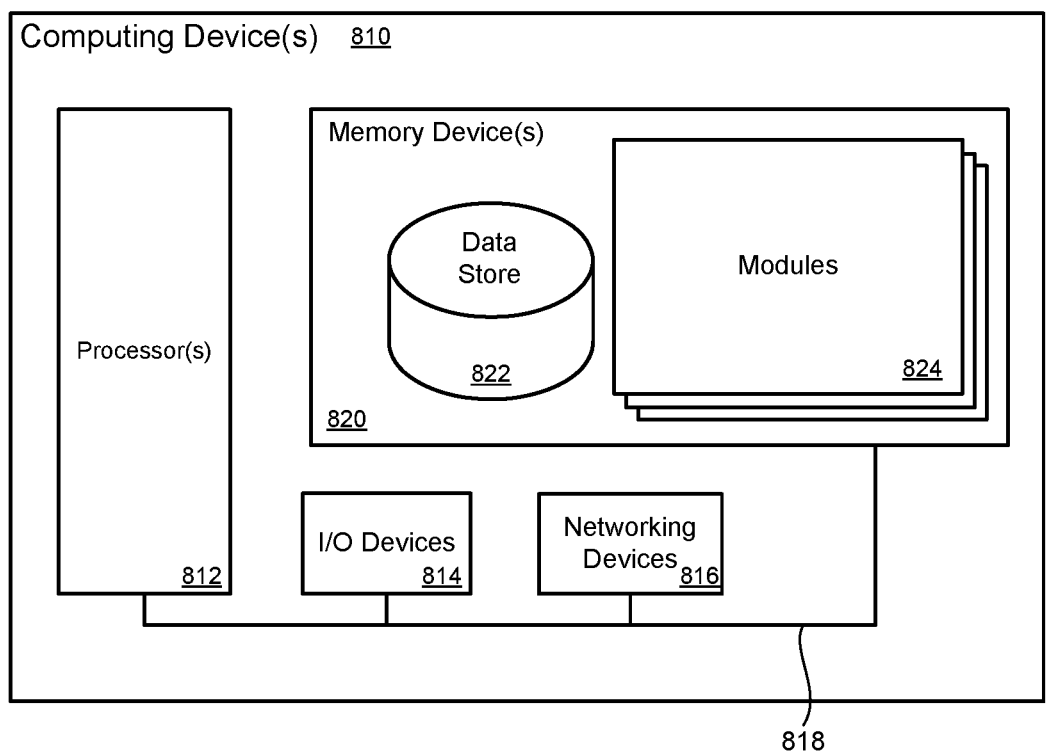
FIG. 8 is block diagram illustrating an example of a computing device that may be used to execute a method for emulating a multicast network using a data store service and a multicast conversion driver that executes on clients.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 that are executable by the processor(s) 812 and data for the modules 824. In one example, the memory device 820 may include a subscribe module and a distribution module used in executing a multicast service. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for emulating a multicast network comprising:
   a processor;
   a memory device including instructions that, when executed by the processor, cause the system to:

receive, at a data store service, a data transaction request to store a data record containing a network packet to a data store managed by the data store service, wherein the data transaction request is received from a source client having a multicast conversion driver that prepares the network packet for multicast distribution to destination clients by placing the network packet into a data transaction request format and sends the data transaction request to the data store service;

process the data transaction request that stores the data record containing the network packet in a data store;

identify a multicast identifier in the data transaction request that indicates to the data store service that the data transaction request is a multicast distribution request;

identify the destination clients that are subscribed to receive multicast communications addressed to a multicast IP address specified in the data transaction request from the data store service and distributed through the data store service; and send a copy of the data record containing the network packet to a plurality of the destination clients having the multicast conversion driver configured to extract the network packet from the data record.

2. A system as in claim 1, wherein the multicast conversion driver on the source client receives the network packet from an application layer and prepares the data transaction request as a data write request.

3. A system as in claim 1, wherein the memory device includes instructions that, when executed by the processor, causes the system to further send the copy of the data record containing the network packet to the plurality of the destination clients using a push channel.

4. A system as in claim 1, wherein the multicast conversion driver on the destination clients receive a data read request response from the data store service and provide the network packet to an application layer.

5. A computer implemented method, comprising:

receiving, at a data store service, a data transaction request to store a data record containing a network packet to a data store managed by the data store service, wherein the data transaction request is received from a source client having a multicast conversion driver that is configured to convert the network packet into a data transaction request format, and the data transaction request contains the network packet for multicast distribution to destination clients;

determining that the data transaction request is a multicast request to distribute the network packet to the destination clients;

identifying the destination clients that are subscribed to receive multicast group communications; and distributing the data record containing the network packet to the destination clients, wherein the destination clients have the multicast conversion driver that is configured to convert the data record to the network packet.

6. A method as in claim 5, further comprising processing the data transaction request to identify a key that includes a multicast IP (Internet Protocol) address used to distribute the network packet to the destination clients and a source client identifier for the source client.

7. A method as in claim 5, wherein the multicast conversion driver encapsulates the network packet in a data interchange format.

8. A method as in claim 5, wherein the multicast conversion driver places the network packet in a binary data field.

9. A method as in claim 5, wherein the multicast conversion driver is registered with the source client and the destination clients as a network interface controller that handles multicast network communication.

10. A method as in claim 5, wherein the multicast conversion driver is an application plug-in to a network interface controller for the source client and the destination clients.

11. A method as in claim 5, further comprising distributing configuration settings to multicast conversion drivers executing on the source client and the destination clients via a central configuration management service.

12. A method as in claim 5, further comprising scaling the data store service by increasing or decreasing a number of data servers included in the data store service according to a number of data transaction requests received from source clients that are multicast requests to distribute network packets to the destination clients.

13. A method as in claim 5, wherein receiving the data transaction request sent by the source client further comprises identifying a data server that is available to process the data transaction request and distribute the data record containing the network packet to the destination clients.

14. A method as in claim 13, wherein identifying the data server further comprises:

generating a hash value using a multicast IP address associated with the network packet and a source client IP address associated with the source client; and mapping the hash value to the data server that is assigned the hash value.

15. A method as in claim 5, wherein receiving the data transaction request sent by the source client further comprises:

receiving a stream of data transaction requests containing network packets included in a multicast data stream; and distributing the data transaction requests to a plurality of data servers that are available to process the data transaction requests.

16. A method as in claim 5, further comprising:

receiving at the data store service a subscribe request for a source client or a destination client; and adding a client identifier for the source client or the destination client to a multicast subscription record.

17. A method as in claim 5, further comprising joining the data store service to a multicast network via an Internet Group Management Protocol (IGMP), wherein the data store service acts as an intermediary for the destination clients that receive multicast group communications through the data store service.

18. A non-transitory machine readable storage medium including instructions embodied thereon, the instructions when executed by one or more processors:

receive, at a data store service, a data transaction request to store a data record containing a network packet in a data store managed by the data store service, wherein the data transaction request is received from a source client having a multicast conversion driver that is configured to convert the network packet into a data transaction request format, and the data transaction request contains a network packet for multicast distribution to a plurality of destination clients;

determine that the data transaction request is a multicast request;

query a multicast subscription record for destination clients that are subscribed to receive multicast group communications; and distribute the data record containing the network packet to the destination clients in the multicast subscription record, wherein the destination clients have the multicast conversion driver configured to convert the data record to the network packet.

19. The non-transitory machine readable storage medium in claim 18, wherein the multicast conversion driver is configured to:

receive the network packet from an application layer on the source client and send the data transaction request containing the network packet to the data store service; and receive data containing the network packet from the data store service at the destination clients and provide the network packet to the application layer on the destination clients.

20. The non-transitory machine readable storage medium in claim 18, wherein the multicast conversion driver on the source client is configured to:

encapsulate the network packet in a data interchange format; and send the data transaction request containing the network packet encapsulated in the data interchange format to the data store service.

21. The non-transitory machine readable storage medium in claim 18, wherein the multicast conversion driver is registered with the source client and the destination client as a network interface controller, and the source client and the destination client send multicast network communications to the multicast conversion driver.

* * * * *